United States Patent [19]

Maynard

[11] Patent Number: 4,682,469
[45] Date of Patent: Jul. 28, 1987

[54] COMPRESSOR POWER UNIT FUEL FLOW CONTROL

[75] Inventor: Frederick C. Maynard, Phoenix, Ariz.

[73] Assignee: The Garrett Corporation, Los Angeles, Calif.

[21] Appl. No.: 784,400

[22] Filed: Oct. 4, 1985

[51] Int. Cl.[4] .............................................. F02C 9/26
[52] U.S. Cl. .................................. 60/39.06; 60/39.27; 60/740
[58] Field of Search ................. 60/39.03, 39.06, 39.27, 60/39.281, 39.29, 734, 740, 741, 39.23; 431/12, 19

[56] References Cited

U.S. PATENT DOCUMENTS

| | | |
|---|---|---|
| 2,963,859 | 12/1960 | Roche et al. . |
| 3,037,348 | 6/1962 | Gassmann ........................... 60/39.29 |
| 3,192,988 | 7/1965 | Porter et al. . |
| 3,224,195 | 12/1965 | Walsh ..................................... 60/740 |
| 3,295,316 | 1/1967 | Beatrice et al. . |
| 3,400,535 | 9/1968 | McLean . |
| 3,438,199 | 4/1969 | McGinnis et al. . |
| 3,611,721 | 10/1971 | Ifield . |
| 3,707,074 | 12/1972 | Meyer et al. ........................... 60/740 |
| 3,745,767 | 7/1973 | Bloom . |
| 3,782,109 | 1/1974 | Linebrink et al. . |
| 3,910,035 | 10/1975 | Johasz et al. ........................ 60/39.29 |
| 4,074,521 | 2/1978 | Smith . |
| 4,149,371 | 4/1979 | Spraker et al. ..................... 60/39.29 |
| 4,470,798 | 9/1984 | Graat et al. ............................ 431/12 |

FOREIGN PATENT DOCUMENTS 601694  3/1926  France ............................... 60/39.27

Primary Examiner—Louis J. Casaregola
Attorney, Agent, or Firm—J. Richard Konneker; James W. McFarland; Albert J. Miller

[57] ABSTRACT

In a gas turbine engine compressor power unit fuel is supplied at an essentially constant pressure to a fuel nozzle for injection into the combustion liner of the power unit's combustor. Nozzle fuel flow is modulated solely by bleeding off combustor supply air to vary the internal liner pressure, thereby altering the fuel pressure drop across the nozzle.

8 Claims, 1 Drawing Figure

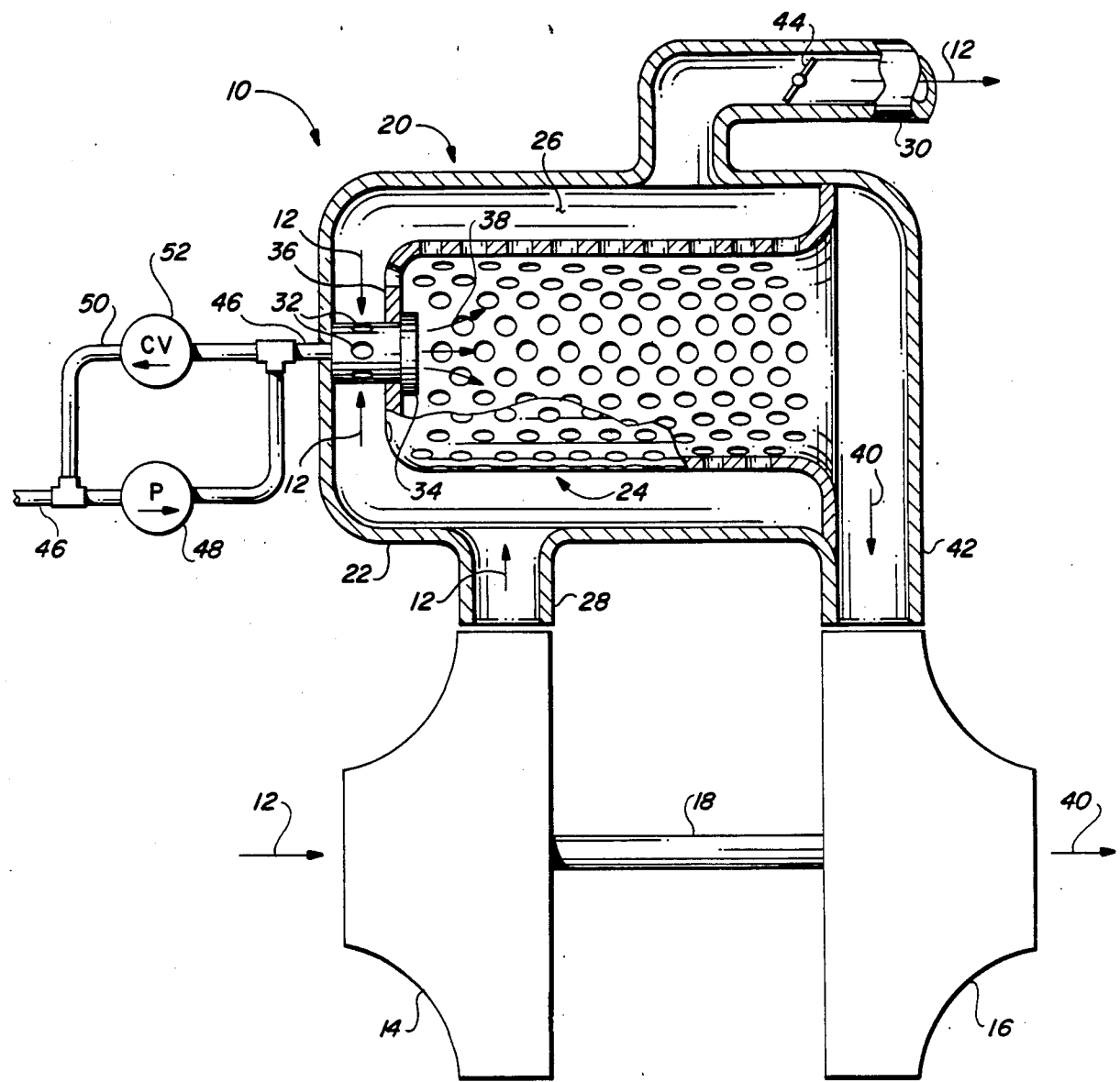

COMPRESSOR POWER UNIT FUEL FLOW CONTROL

BACKGROUND OF THE INVENTION

The present invention relates generally to gas turbine engines, and more particularly provides a uniquely simple fuel flow control system for a turbine engine compressor power unit.

Gas turbine engines are often utilized as compressor power units—i.e., to supply compressed air to a pneumatically-driven system or the like as opposed to providing shaft or propulsive power. Conventionally, the fuel flow through a compressor power unit's relatively high pressure fuel nozzle is controlled by varying the nozzle's fuel inlet pressure in response to sensed variations in a variety of operating parameters of the unit. This fuel flow control method typically results in relatively complex and expensive fuel control system apparatus.

Accordingly, it is an object of the present invention to provide a substantially simpler and less expensive fuel flow control system for a turbine engine compressor power unit.

SUMMARY OF THE INVENTION

The present invention provides a gas turbine engine compressor power unit which has an inexpensive and greatly simplified fuel flow control system. A relatively low pressure fuel nozzle, such as an air blast nozzle, is used to inject fuel into the unit's combustor liner. Fuel is supplied to the nozzle at an essentially constant pressure, and means are provided for bleeding off a selectively variable quantity of compressor discharge air for supply to a pneumatically-operated system or the like.

Variance in the bleed air flow rate is allowed to concomitantly vary the pressure within the combustor liner which, in turn, alters the fuel pressure drop across the nozzle without appreciably changing the nozzle fuel supply pressure. This pressure drop variance automatically modulates fuel flow through the nozzle without the necessity of any direct control feedback to the fuel supply system, thereby substantially reducing the cost and complexity thereof.

According to a feature of the invention, the effectiveness of the aforementioned fuel flow control method is maximized by correlating the various components of the compressor power unit to maintain the absolute pressure ratio between the fuel nozzle inlet pressure and the internal liner pressure within a predetermined range as the bleed air flow is varied between its minimum and maximum value.

BRIEF DESCRIPTION OF THE DRAWING

The single drawing FIGURE is a partially schematic, partially cross-sectional illustration of a turbine engine compressor power unit embodying fuel flow control principles of the present invention.

DETAILED DESCRIPTION

Illustrated in the drawing is a gas turbine engine compressor power unit 10 which embodies principles of the present invention and is utilized to supply a flow of compressed ambient air 12 to an air-utilizing apparatus or system (not shown). Unit 10 comprises a compressor 14, a turbine 16 rotationally coupled to the compressor by a shaft 18, and a combustor 20 having an outer housing 22 and a perforated combustion liner 24 positioned within the housing. Circumscribing the liner 24 within housing 22 is an inlet plenum 26 which opens outwardly through a housing inlet 28 and a bleed air duct 30 used to flow the compressed air 12 to its end apparatus or system in a manner subsequently described.

During operation of the compressor power unit 10, ambient air 12 is drawn into the compressor 14, compressed, and flowed into the inlet plenum 26 through the housing inlet 28. A portion of the compressed air 12 entering the inlet plenum 26 is forced into the air inlets 32 of a relatively low pressure air blast fuel injection nozzle 34, of conventional construction, which extends inwardly through a left end wall 36 of the combustion liner 24. As used herein with reference to the nozzle 34, the term "relatively low pressure" means a fuel inlet supply pressure no greater than approximately 130 percent of the internal liner pressure during operation of the unit 10.

A further portion of the compressed air 12 entering the inlet plenum is forced into the liner 24 through its perforations. In a manner to be described, fuel from a source thereof (not shown) is supplied to the nozzle 34 and mixed with the compressed air entering its inlets 32 to form a fuel-air mixture 38 which is injected into the interior of the combustion liner 24. In a conventional manner, the fuel-air mixture 38 and the compressed air 12 entering the liner interior are burned to form a hot, expanded gas 40 that is expelled from the combustor 20, through a housing outlet 42, into and through the turbine 16. Passage through the turbine 16 of the hot, expanded exhaust gas 40 rotationally drives the turbine and, via the shaft 18, the compressor 14. To bleed off a selectively variable quantity of compressor discharge air 12 entering the combustor inlet plenum 26, a valve 44 is operatively positioned in the bleed air duct 30. Valve 44 may be manually operated, or may be automatically modulated by a suitable control system associated with the air-utilizing end system or apparatus to which the bleed air 12 is flowed through the duct 30.

The present invention provides a uniquely simple method of controlling the nozzle fuel flow rate which will now be described. Fuel is supplied to the nozzle 34 from a source thereof through a conduit 46 by means of a fuel pump 48 operatively installed therein. The pump 48 may be of any suitable construction, and may be either gear or electrically driven.

Importantly, and quite unlike conventional fuel delivery systems, the fuel delivered to the nozzle 34 is supplied thereto at an essentially constant pressure. Maintenance of this essentially constant fuel supply pressure is achieved by means of a fuel bypass conduit 50 connected at its opposite ends to the supply conduit 46 upstream and downstream of the pump 48, and having installed therein pressure regulating means in the form of a spring-loaded check valve 52 set to maintain the predetermined constant fuel supply pressure to the nozzle 34.

The fuel flow rate through the nozzle 34 is controlled not by in any manner altering the pressure of fuel supplied to the nozzle through conduit 46, but solely by varying the fuel pressure drop across the nozzle. Such pressure drop variation is achieved by utilizing the valve 44 to modulate the flow of bleed air 12 through the bleed air supply duct 30. Changes in the bleed air supply flow rate concomitantly vary the pressure within the combustion liner 24 which, in turn, varies the fuel pressure drop across the nozzle and the fuel flow rate therethrough.

It is important to note that modulation of the bleed air flow rate automatically varies the nozzle fuel flow rate—there is no direct control system feedback to the nozzle fuel supply system. As a significant side benefit of this greatly simplified fuel flow control system, the pressure of the bleed air 12 supplied through the duct 30 is also automatically maintained at an essentially constant pressure level during operation of the compressor power unit 10.

In developing the present invention, it has been found that the effectiveness of the aforementioned novel fuel flow rate control system is maximized by correlating the configurational and operating characteristics of the compressor 14, the combustor 20 and the bleed air duct 30 in a manner maintaining the absolute pressure ratio between the fuel inlet supply pressure and the internal pressure of the combustion liner 24 within a predetermined range. Specifically, it has been found that it is preferable to maintain such absolute pressure ratio within the range of about 1.1 to about 1.5—the approximate end points of such range generally corresponding to the variation in bleed air supply flow rate from a minimum value to a maximum value.

As a specific example of the maintenance of this absolute pressure ratio range, in the illustrated embodiment of the present invention, with the valve 44 in its fully closed position, the fuel supply pressure to the nozzle 34 is approximately 44 psia, and the internal liner pressure is approximately 39.0 psia, so that the fuel supply-to-liner absolute pressure ratio is approximately 1.13. At full load condition, with the valve 44 in a fully open position, the liner internal pressure is reduced to approximately 34.0 psia, changing the fuel supply-to-liner absolute pressure ratio to approximately 1.3.

It is also desirable in the illustrated embodiment of the present invention to maintain the fuel flow variation (corresponding to bleed air flow variation between no load and full load conditions) within the range of from about twenty five to fifty percent. In the illustrated example, variation of the liner internal pressure between approximately 39.0 psia and 34.0 psia increases the nozzle's fuel flow rate from approximately 30 lb/min to approximately 42.4 lb/min—a flow rate variation of slightly more than 40 percent.

The foregoing detailed description is to be clearly understood as given by way of illustration and example only, the spirit and scope of this invention being limited solely by the appended claims.

What is claimed is:

1. A method of controlling fuel flow through a nozzle positioned in a combustor receiving pressurized combustion air from a source thereof, said method comprising the steps of:
   (a) supplying fuel at an essentially constant pressure to the nozzle; and
   (b) altering the fuel pressure drop across the nozzle solely by varying the air pressure within the combustor to thereby selectively vary the fuel flow through the nozzle,
   the combustor having a liner adapted to receive fuel discharged from the nozzle and pressurized combustion air, and wherein said altering step (b) is performed by varying the air pressure within the liner in a manner maintaining the absolute pressure ratio of the fuel supply pressure to the liner interior pressure within a predetermined range from about 1.1 to about 1.3.

2. A method of controlling fuel flow through a nozzle positioned in a combustor receiving pressurized combustion air from a source thereof, said method comprising the steps of:
   (a) supplying fuel at an essentially constant pressure to the nozzle; and
   (b) altering the fuel pressure drop across the nozzle solely by varying the air pressure within the combustor to thereby selectively vary the fuel flow through the nozzle,
   the combustion air being received from a compressor and wherein said altering step (b) includes the step of bleeding off a selectively variable quantity of compressor discharge air.

3. The method of claim 2 wherein said bleeding off step is performed by bleeding off compressor discharge air within a bleed air flow rate range selected to maintain the fuel flow rate through the nozzle between a minimum fuel flow rate and a maximum fuel flow rate approximately fifty percent higher than said minimum fuel flow rate.

4. A method of controlling fuel flow through a nozzle positioned in a combustor receiving pressurized combustion air from a source thereof, said method comprising the steps of:
   (a) supplying fuel at an essentially constant pressure to the nozzle; and
   (b) altering the fuel pressure drop across the nozzle solely by varying the air pressure within the combustor to thereby selectively vary the fuel flow through the nozzle,
   the combustor having a perforated liner circumscribed by a combustion air intake plenum, the nozzle being positioned to inject fuel into the liner, and combustion air received by the intake plenum being forced into the liner, and wherein said altering step (b) is performed by varying the quantity of combustion air entering the liner.

5. The method of claim 4 wherein said combustion air quantity varying step is performed by bleeding air from the intake plenum.

6. A method of operating a gas turbine engine compressor power unit having a combustor receiving pressurized air discharged from a compressor, and pressurized fuel through a nozzle having a fuel inlet pressure and a fuel pressure drop, said compressor power unit further having a duct for bleeding off a portion of the air discharged from the compressor, said method comprising the steps of:
   (a) maintaining the nozzle fuel inlet pressure at an essentially constant level;
   (b) selectively varying the air flow through the duct to thereby vary a pressure within the combustor and the fuel pressure drop across the nozzle; and
   (c) utilizing only the pressure variation within the combustor, and the corresponding variation in fuel pressure drop across the nozzle, to directly modulate fuel flow through the nozzle.

7. The method of claim 6 wherein the combustor has a liner receiving fuel from the nozzle, wherein said varying step (b) is performed in a manner varying the pressure within the liner, and wherein said method further comprises the step of maintaining the absolute pressure ratio between the nozzle fuel inlet pressure and the liner interior pressure within the range of from about 1.1 to about 1.3.

8. The method of claim 6 wherein said varying step (b) is performed by varying the air flow between a minimum and maximum flow rate selected to vary the fuel flow rate through the nozzle between a minimum fuel flow rate and a maximum fuel flow rate approximately fifty percent greater than said minimum fuel flow rate.

* * * * *